United States Patent
Shah et al.

(10) Patent No.: US 8,655,913 B1
(45) Date of Patent: Feb. 18, 2014

(54) METHOD FOR LOCATING WEB ELEMENTS COMPRISING OF FUZZY MATCHING ON ATTRIBUTES AND RELATIVE LOCATION/POSITION OF ELEMENT

(75) Inventors: Tejas Arvindkumar Shah, Santa Clara, CA (US); Po Hu, Redmond, WA (US)

(73) Assignee: Google Inc., Mountain View, CA (US)

( * ) Notice: Subject to any disclaimer, the term of this patent is extended or adjusted under 35 U.S.C. 154(b) by 45 days.

(21) Appl. No.: 13/430,495

(22) Filed: Mar. 26, 2012

(51) Int. Cl.
*G06F 7/00* (2006.01)
*G06F 17/30* (2006.01)

(52) U.S. Cl.
USPC .......................................... 707/780; 715/234

(58) Field of Classification Search
USPC ............................ 707/736, 758, 780; 715/234
See application file for complete search history.

(56) References Cited

U.S. PATENT DOCUMENTS

| | | | |
|---|---|---|---|
| 6,442,576 B1 * | 8/2002 | Edelman et al. | 715/234 |
| 7,917,755 B1 * | 3/2011 | Giliyaru et al. | 713/169 |
| 8,381,095 B1 * | 2/2013 | Fischer | 715/234 |
| 2004/0163041 A1 * | 8/2004 | Engel | 715/509 |
| 2005/0022116 A1 * | 1/2005 | Bowman et al. | 715/513 |
| 2005/0149576 A1 * | 7/2005 | Marmaros et al. | 707/200 |
| 2007/0150838 A1 * | 6/2007 | Moser | 715/822 |
| 2011/0137933 A1 * | 6/2011 | Pelenur et al. | 707/769 |

OTHER PUBLICATIONS

Clark, et al., "XML Path Language (XPath) Version 1.0", W3C Recommendation, Nov. 16, 1999, retrieved from <http://www.w3.org/TR/xpath>.
"Bite-project: Browser Integrated Testing Environment", Google Project Hosting, 2011, retrieved from <http://code.google.com/p/bite-project>.
Van Kesteren, et al., "Selectors API Level 1", W3C Candidate Recommendation, Dec. 22, 2009, retrieved from <http://www.w3.org/TR/selectors-api>.

* cited by examiner

*Primary Examiner* — Hares Jami
(74) *Attorney, Agent, or Firm* — McDermott Will & Emery LLP (57) ABSTRACT

The subject technology discloses techniques for locating an element in a document object model (DOM) tree structure based on fuzzy matching of attributes of the element and the relative positioning of other elements in the DOM tree structure. For instance, different attributes for searching an element in a DOM tree structure are received. The subject technology determines a location of an element in a DOM tree structure based on the plurality of attributes. A relative location of the element in the DOM tree structure is then determined if determining the location of the element is unsuccessful based on the plurality of attributes. In one example, the relative location of the element is based on fuzzy matching according to a predetermined percentage of one or more matching attributes and based on respective positions of one or more elements in the DOM tree structure.

23 Claims, 5 Drawing Sheets

METHOD FOR LOCATING WEB ELEMENTS COMPRISING OF FUZZY MATCHING ON ATTRIBUTES AND RELATIVE LOCATION/POSITION OF ELEMENT

BACKGROUND

Web page testing tools or web analysis tools use various Document Object Model (DOM) techniques to locate an element(s) on a web page for testing or development purposes. However, many DOM techniques for locating an element(s) are not robust and can be prone to premature failures when certain conditions are encountered.

SUMMARY

The subject technology provides for locating an element in a document object model (DOM) tree structure based on fuzzy matching of attributes of the element and the relative positioning of other elements in the DOM tree structure. In some configurations, a plurality of attributes are received for searching an element in a DOM tree structure. The subject technology determines a location of an element in a DOM tree structure based on the plurality of attributes. A relative location of the element is then determined in the DOM tree structure if determining the location of the element is unsuccessful based on the plurality of attributes. The relative location of the element in some configurations is based on fuzzy matching according to a predetermined percentage of one or more matching attributes and based on respective positions of one or more elements in the DOM tree structure.

Yet another aspect of the subject technology provides a system for locating an element in a document object model (DOM) tree structure based on fuzzy matching of attributes of the element and the relative positioning of other elements in the DOM tree structure. The system includes memory, one or more processors, and one or more modules stored in memory and configured for execution by the one or more processors. The system includes a DOM attributes module configured to receive a plurality of attributes for searching an element in a DOM tree structure in which the DOM tree structure includes one or more nodes respectively representing different elements in a web page. The system further includes a DOM attributes search module configured to determine a location of an element in a DOM tree structure based on the plurality of attributes in which the location of the element corresponds to a respective node in the DOM tree structure. Additionally, the system includes a relative location module configured to determine a relative location of the element in the DOM tree structure if determining the location of the element is unsuccessful based on the plurality of attributes. In some configurations, the relative location of the element is based on fuzzy matching according to a predetermined percentage of one or more matching attributes and based on respective positions of one or more elements in the DOM tree structure.

The subject technology further provides for receiving a plurality of attributes for searching an element in a document object model (DOM) tree structure. The subject technology determines if there is an exact match of at least one attribute among the plurality of attributes corresponding to at least one element in the DOM tree structure. A relative location of the element is then determined in the DOM tree structure if determining the location of the element is unsuccessful based on the exact match. In some configurations, the relative location of the element is based on fuzzy matching according to a confidence level of one or more matching attributes and based on respective positions of one or more elements in the DOM tree structure.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In some configurations, web content in a given web page is represented based on a Document Object Model (DOM) that represents each element (e.g., forms, buttons, textual content, etc.) from the web page. The DOM in some configurations is configured as a tree data structure including discrete elements as nodes within branches of the DOM tree. For instance, a node in the DOM tree can represent an object that corresponds with an element from the web content.

Web page testing tools or web analysis tools use various DOM techniques to locate an element on a web page for testing or development purposes. Web pages frequently change and some web pages are dynamically generated using automated techniques. Due to frequent changes of web pages (e.g., web page revisions, etc.), existing DOM techniques for locating an element(s) in a web page become unreliable. As a result, changes in techniques for locating a web element(s) are often required to maintain their functionality and success in locating an element(s) of a web page(s).

To better illustrate the issues with existing solutions, the following scenario is described. In one example, an application (e.g., testing tool or script) attempts to locate a text box element on a page (e.g., by searching a DOM tree structure of the page). Typically, a testing/development tool attempts to locate this element using a combination of class, name, ID or other attributes of an element. However, in order to locate the element, the attribute is typically hard-coded in order to perform an exact match of the attribute in the page. If locating the element based on the single attribute fails, then the tool stops locating the element. As a result, a change(s) in a page can break this way of locating an element. This often results in cumbersome/arduous maintenance efforts because existing tools typically utilize a single attribute to locate an element and frequent changes are required to update the single attribute to reflect changes in the page.

To address the aforementioned issues, the subject technology enables the usage and recordation of a multiplicity of attributes of an element, which are used to make several attempts to locate an element before failing. In particular, the subject technology locates an element in a DOM tree data structure (representing a web page) using fuzzy matching of one or more attributes in the DOM tree data structure (e.g. instead of requiring an exact match of the attribute(s)). By way of example, fuzzy matching supports searching and matching of an attribute(s) in the DOM tree data structure based on a suffix, prefix and/or a wildcard. Other types of fuzzy matching can be included and still be within the scope of the subject technology.

Some current implementations for locating an element in a DOM tree data structure rely upon techniques based on XPATH and/or QuerySelector. The herein-described fuzzy matching of locating an element in the DOM tree data structure, however, is different than the aforementioned techniques based on XPATH and QuerySelector. For instance, the herein-described fuzzy matching and relative locating of an element initially attempts to identify the location of a previously recorded and uniquely identifiable object in the DOM tree data structure and then traverses the DOM tree data structure from the identified location. In contrast, an example solution based on XPATH and/or QuerySelector attempts to locate a uniquely identifiable node/element in a static manner (e.g., its location has to be pre-provided or pre-identified and no dynamic lookup or heuristic approach is involved.). Consequently, XPATH and/or QuerySelector fails to provide a heuristic approach in its element look-up mechanism. Further, XPATH and/or QuerySelector fails to make multiple attempts with variations in the pattern to locate an element, and instead relies upon a single attempt to identify an element with a provided or given pattern (e.g., search query string).

In view of the above disadvantages of solutions based on XPATH and/or QuerySelector, the subject technology further provides for locating an element in a page based on a technique utilizing relative positioning of the element. In one example, a web page has an element with no unique or distinguishable attributes (or the attributes corresponding to the element have substantially changed). With the relative positioning technique, the subject technology determines the position of a uniquely identifiable element closest to the element of interest (e.g., the element that is searched for) and using this information identifies the (previously indistinguishable) element of interest in the DOM tree data structure. This is accomplished by generating a hash of all attributes included in a previous version of the DOM tree data structure of the web page and comparing it with a hash of all attributes of a current version of the DOM tree data structure of the web page. More specifically, the subject technology determines that the element of interest was previously successfully located in a certain position or node in the previous version of the DOM tree data structure (e.g., based on a location attribute of the element) and starts traversing or searching from that position in the current version of the DOM tree data structure. The element of interest can then be identified or matched based on a level of confidence, which is derived based on the amount of matching attributes and how closely it matches with original recorded attributes and positions (e.g., a percentage of matching attributes).

Figure 1:
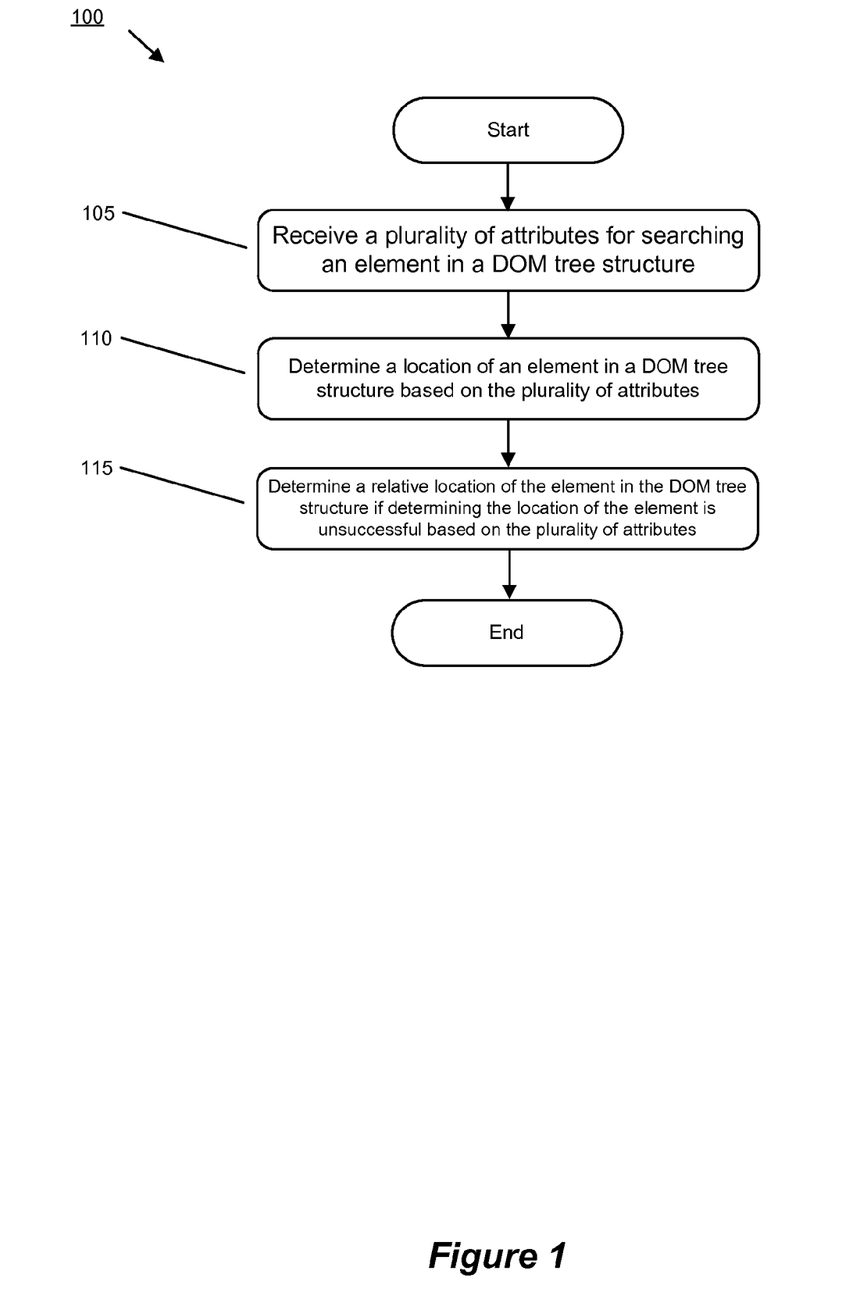
FIG. 1 conceptually illustrates an example process for locating an element in a document object model (DOM) tree structure based on fuzzy matching of attributes of the element and the relative positioning of other elements in the DOM tree structure.

FIG. 1 conceptually illustrates an example process 100 for locating an element in a document object model (DOM) tree structure based on fuzzy matching of attributes of the element and the relative positioning of other elements in the DOM tree structure. The process 100 is performed by one or more computing devices or systems in some configurations.

The process 100 begins at 105 by receiving a plurality of attributes for searching an element in a DOM tree structure. For instance, the plurality of attributes include class, name, and ID attributes. Other types of attributes can be included and still be within the scope of the subject technology. Further, the DOM tree structure includes a plurality of nodes respectively corresponding to a plurality of elements for a specified web page. Each of the nodes include one or more of attributes with respective values for different properties (e.g., HTML properties) associated with the node. In one example, all attributes for each element in the web page are recorded for later determining a location for a particular element.

The process 100 at 110 determines a location of an element in a DOM tree structure based on the plurality of attributes. In some configurations, the plurality of attributes are treated equally in order to determine the location of the element. The process 100 performs a search for the element in the DOM tree structure in one example. The process 100, for instance, traverses one or more nodes of the DOM tree structure in order to determine the location of the element based on the plurality of attributes. Alternatively, a relative importance (e.g., numerical score or weight) of each attribute among the plurality of attributes can be specified. In this manner, the process 100 will pick an element that gets a highest score based on the relative importance of any matched attributes.

The process 100 at 115 determines a relative location of the element in the DOM tree structure if determining the location of the element is unsuccessful based on the plurality of attributes. In one example, the relative location of the element is based on fuzzy matching according to a predetermined percentage of one or more matching attributes and based on respective positions of one or more elements in the DOM tree structure. In one example, determining the relative location of the element in the DOM tree is based on a previously successful determined location of the element in the DOM tree structure. More specifically, the relative location of the element is determined by searching from neighboring nodes of the DOM tree structure from the previously successful determined location of the element. Additionally, the previously successful determined location of the element is based on a comparison of a prior version of the DOM tree structure with a current version of the DOM tree structure. By way of example, the comparison is performed by utilizing a hash of one or more attributes of the prior version of the DOM tree structure and a hash of the one or more attributes of the current version of the DOM tree structure. The one or more attributes include a location attribute. The hash of the one or more attributes is based on a hash function. The process 100 then ends.

Figure 2:
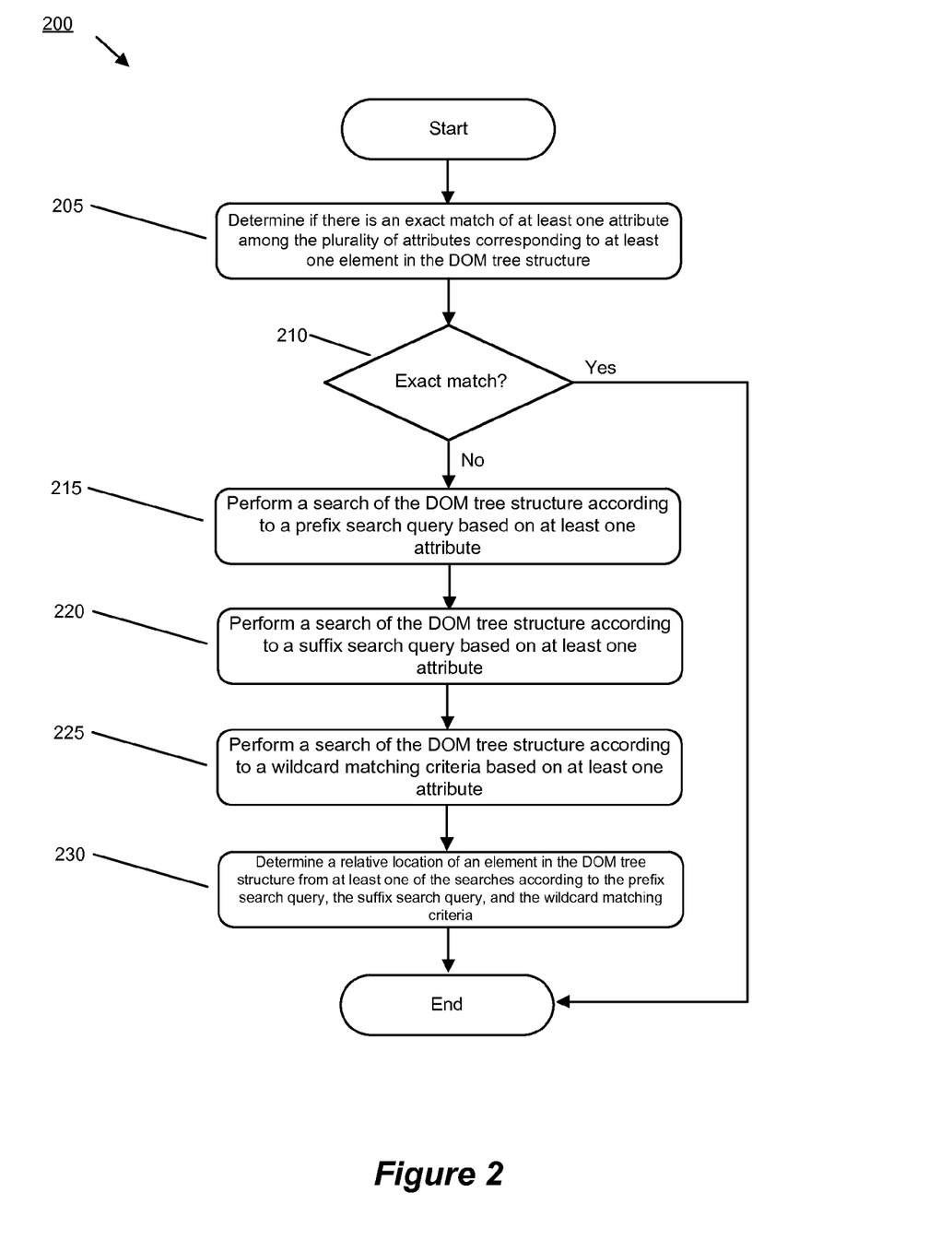
FIG. 2 conceptually illustrates an example process for determining an exact match of at least one attribute and performing one or more further different searches for an attribute(s).

FIG. 2 conceptually illustrates an example process for determining an exact match of at least one attribute and performing one or more further different searches for an attribute(s). The process 200 can be performed by one or more computing devices or systems in some configurations. In some configurations, the process 200 can be performed conjunctively with the process 100 in FIG. 1.

The process 200 begins at 205 by determining if there is an exact match of at least one attribute among the plurality of attributes corresponding to at least one element in the DOM tree structure. Referring to FIG. 1, the process 100 at 110 determines the location of the element in the DOM tree structure by performing the operation at 205 in one example.

The process 200 at 210 determines if there is exact match of at least one attribute to at least one element in the DOM tree structure. If an exact match is determined, the process 200 then ends. Alternatively, if no exact match is determined, the process 200 continues to 215 by performing a search of the DOM tree structure according to a prefix search query based on at least one attribute. The process 200 at 220 then performs a search of the DOM tree structure according to a suffix search query based on at least one attribute. Further, the process at 225 performs a search of the DOM tree structure according to a wildcard matching criteria based on at least one attribute.

The process 200 at 230 determines a relative location of an element in the DOM tree structure from at least one of the searches according to the prefix search query, the suffix search query, and the wildcard matching criteria. In one example, determining the relative location of the element is according to fuzzy matching based on a confidence level of the prefix search query, the suffix search query, and the search according to the wildcard matching criteria. For instance, the confidence level indicates an amount of matching (e.g., a percentage value) of a search and a respective attribute of a respective element in the DOM tree data structure. The process 200 then ends. In this manner, a more robust technique for locating an element(s) in the DOM tree data structure can be provided by the process 200. Although three different types of searches are described in the process 200, other types of searches (e.g., involving regular expressions, keywords, and other parameters) can be performed by the process 200 and still within the scope of the subject technology. Further, the order in which different searches are performed can be varied. For example, the searches performed by the process 200 at 215-225 can be in a different order(s) and still be within the scope of the subject technology.

Figure 3:
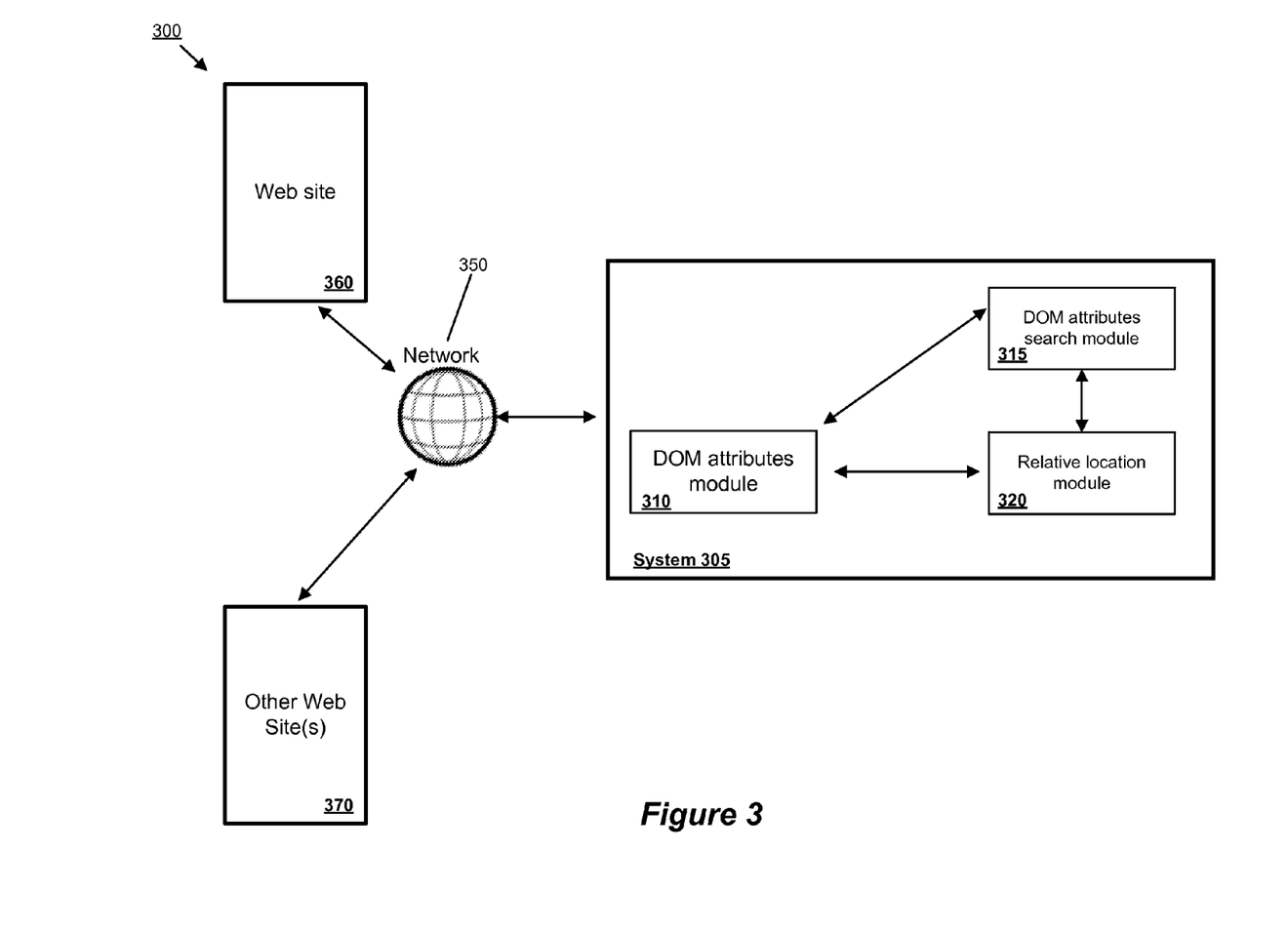
FIG. 3 conceptually illustrates an example computing environment.

FIG. 3 conceptually illustrates an example computing environment 300 including a system. In particular, FIG. 3 shows a system 305 for implementing the above described processes in FIGS. 1 and 2. In some configurations, the system 305 is part of an implementation running a particular machine (e.g., client computer, laptop, notebook, netbook, etc.).

The system 305 can include memory, one or more processors, and one or more modules stored in memory and configured for execution by the one or more processors. As shown in FIG. 3, the system 305 includes several modules for providing different functionality. The system 305 is configured to include a DOM attributes module 310, a DOM attributes search module 315, and a relative location module 320.

The DOM attributes module 310 is configured to receive a plurality of attributes for searching an element in a DOM tree structure in which the DOM tree structure includes one or more nodes respectively representing different elements in a web page. The DOM attributes search module 315 is configured to determine a location of an element in a DOM tree structure based on the plurality of attributes in which the location of the element corresponds to a respective node in the DOM tree structure. The relative location module 320 is configured to determine a relative location of the element in the DOM tree structure if determining the location of the element is unsuccessful based on the plurality of attributes. For instance, the relative location of the element is based on fuzzy matching according to a predetermined percentage of one or more matching attributes and based on respective positions of one or more elements in the DOM tree structure.

In some configurations, the DOM attributes search module 315 is further configured to determine if there is an exact match of at least one attribute among the plurality of attributes corresponding to at least one element in the DOM tree structure. The relative location module 320 is further configured to, if no exact match of at least one attribute to at least one element in the DOM tree structure is determined by the DOM attributes search module, perform a search of the DOM tree structure according to a prefix search query based on at least one attribute, perform a search of the DOM tree structure according to a suffix search query based on at least one attribute, and perform a search of the DOM tree structure according to a wildcard matching criteria based on at least one attribute. Additionally, the relative location module is further configured to determine a relative location of an element in the DOM tree structure from at least one of the searches according to the prefix search query, the suffix search query, and the wildcard matching criteria. In one example, determining the relative location of the element in the DOM tree is based on a previously successful determined location of the element in the DOM tree structure. The relative location of the element is determined by searching from neighboring nodes of the DOM tree structure from the previously successful determined location of the element. The previously successful determined location of the element is based on a comparison of a prior version of the DOM tree structure with a current version of the DOM tree structure. In particular, the comparison is performed by utilizing a hash of one or more attributes of the prior version of the DOM tree structure and a hash of the one or more attributes of the current version of the DOM tree structure.

As further shown in FIG. 3, each of the aforementioned modules can be configured to communicate between each other. For instance, different data, messages, API calls and returns can be passed between the different modules in the system 305.

The system 305 can communicate over a network 350 with a web site 360. The site 360 can each be configured to communicate with the aforementioned modules of the system 305. For instance, the system 305 can transmit a request for web content (e.g., including one or more HTML elements in order to generate the DOM tree data structure) over the network 350 to the web site 360. The web site 360 can then transmit the requested web content hosted by the web site 360 over the network 350 to the system 305. As further shown in FIG. 3, the system 305 can communicate over the network 350 with other web site(s) 370 in a similar manner.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which some configurations of the subject technology can be implemented.

Figure 4:
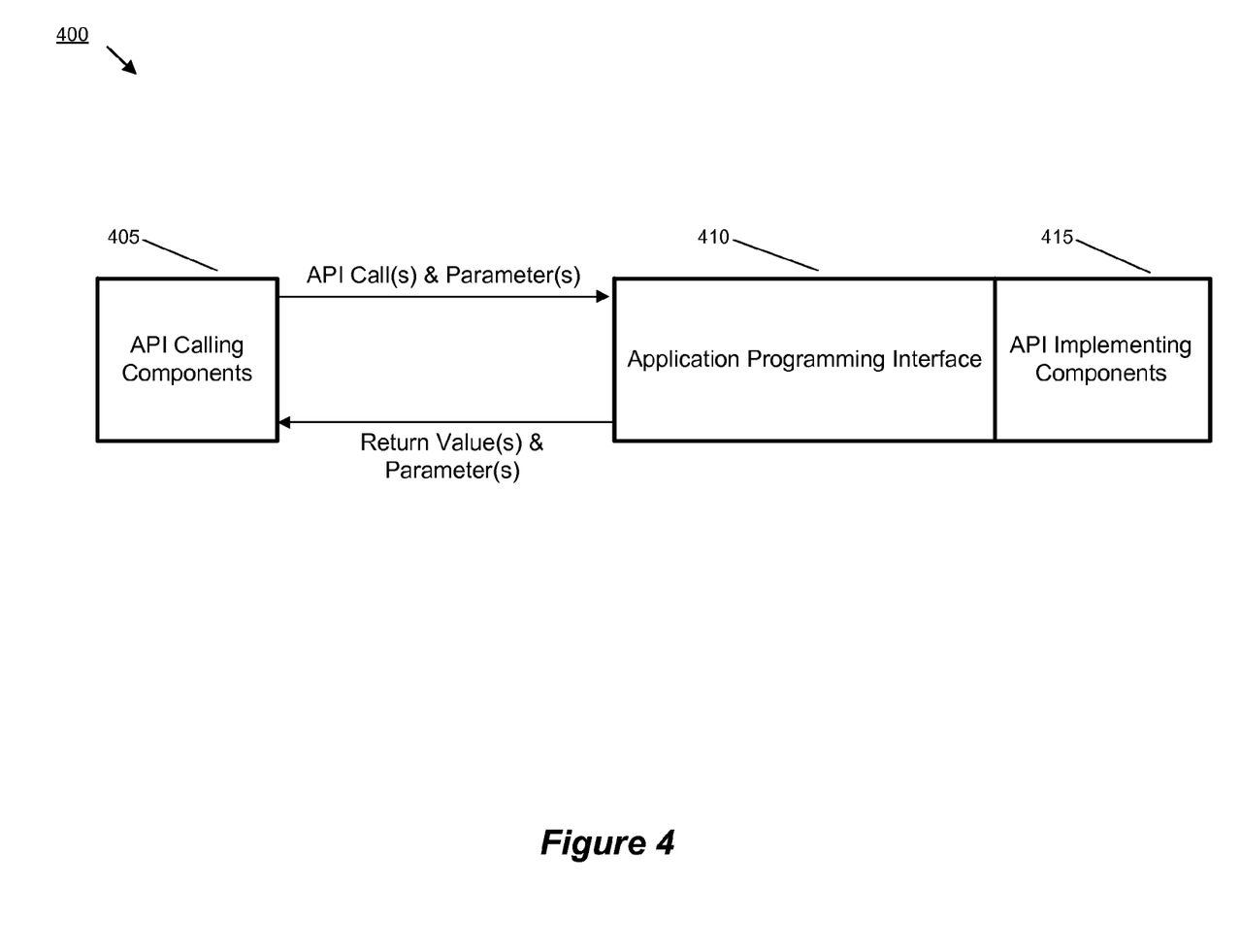
FIG. 4 conceptually illustrates an example application programming interface (API) architecture.

FIG. 4 is a block diagram illustrating an example API architecture, which can be used in some configurations of the subject technology. As shown in FIG. 4, the API architecture 400 includes the API implementing component 415 (e.g., an operating system, a library, a device driver, an API, an application program, software or other module) that implements the API 410. The API 410 specifies one or more functions, methods, classes, objects, protocols, data structures, formats and/or other features of the API-implementing component that can be used by the API-calling component 405. The API 410 can specify at least one calling convention that specifies how a function in the API implementing component receives parameters from the API calling component and how the function returns a result to the API calling component. The API calling component 405 (e.g., an operating system, a library, a device driver, an API, an application program, software or other module), makes API calls through the API 410 to access and use the features of the API implementing component 415 that are specified by the API 410. The API implementing component 415 can return a value through the API 410 to the API calling component 405 in response to an API call.

It will be appreciated that the API implementing component 415 can include additional functions, methods, classes, data structures, and/or other features that are not specified through the API 410 and are not available to the API calling component 405. It should be understood that the API calling component 405 can be on the same system as the API implementing component 415 or can be located remotely and accesses the API implementing component 415 using the API 410 over a network. While FIG. 4 illustrates a single API calling component 405 interacting with the API 410, it should be understood that other API calling components, which can be written in different languages (or the same language) than the API calling component 405, can use the API 410.

The API implementing component 415, the API 410, and the API calling component 405 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

The following description describes an example system in which aspects of the subject technology can be implemented.

Figure 5:
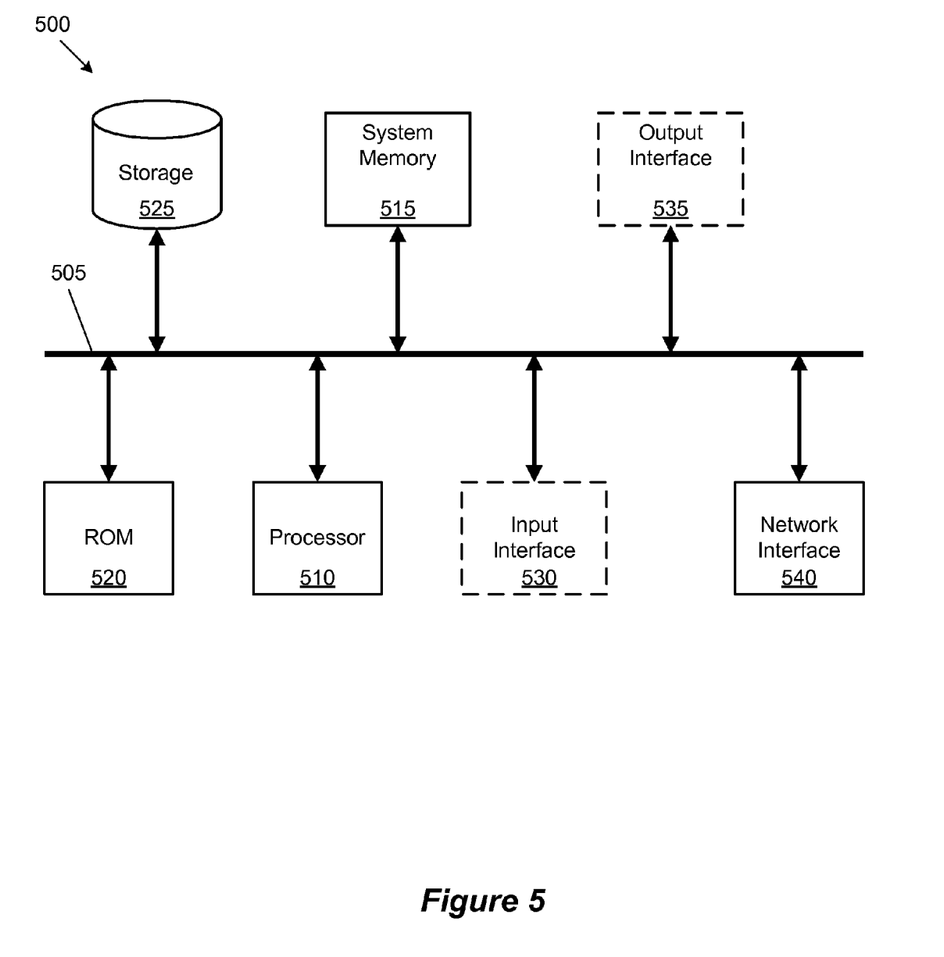
FIG. 5 conceptually illustrates a system with which some implementations of the subject technology may be implemented.

FIG. 5 conceptually illustrates a system 500 with which some implementations of the subject technology can be implemented. The system 500 can be a computer, phone, PDA, or any other sort of electronic device. In some configurations, the system 500 includes a television with one or more processors embedded therein. Such a system includes various types of computer readable media and interfaces for various other types of computer readable media. The system 500 includes a bus 505, processing unit(s) 510, a system memory 515, a read-only memory 520, a storage device 525, an optional input interface 530, an optional output interface 535, and a network interface 540.

The bus 505 collectively represents all system, peripheral, and chipset buses that communicatively connect the numerous internal devices of the system 500. For instance, the bus 505 communicatively connects the processing unit(s) 510 with the read-only memory 520, the system memory 515, and the storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the system 500. The storage device 525, on the other hand, is a read-and-write memory device. This device is a non-volatile memory unit that stores instructions and data even when the system 500 is off. Some implementations of the subject technology use a mass-storage device (such as a magnetic or optical disk and its corresponding disk drive) as the storage device 525.

Other implementations use a removable storage device (such as a flash drive, a floppy disk, and its corresponding disk drive) as the storage device 525. Like the storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the subject technology's processes are stored in the system memory 515, the storage device 525, and/or the read-only memory 520. For example, the various memory units include instructions for processing multimedia items in accordance with some implementations. From these various memory units, the processing unit(s) 510 retrieves instructions to execute and data to process in order to execute the processes of some implementations.

The bus 505 also connects to the optional input and output interfaces 530 and 535. The optional input interface 530 enables the user to communicate information and select commands to the system. The optional input interface 530 can interface with alphanumeric keyboards and pointing devices (also called "cursor control devices"). The optional output interface 535 can provide display images generated by the system 500. The optional output interface 535 can interface with printers and display devices, such as cathode ray tubes (CRT) or liquid crystal displays (LCD). Some implementations can interface with devices such as a touchscreen that functions as both input and output devices.

Finally, as shown in FIG. 5, bus 505 also couples system 500 to a network interface 540 through a network adapter (not shown). In this manner, the computer can be a part of a network of computers (such as a local area network ("LAN"), a wide area network ("WAN"), or an Intranet, or an interconnected network of networks, such as the Internet. Any or all components of system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A machine-implemented method for locating an element in a document object model (DOM) tree structure based on fuzzy matching of attributes of the element and relative positioning of other elements in the DOM tree structure, the method comprising:
   receiving a plurality of attributes for searching an element in a DOM tree structure;
   determining a location of the element in the DOM tree structure based on the plurality of attributes; and
   if determining location of the element based on the plurality of attributes is unsuccessful:
      searching the DOM tree structure based at least in part on one of: a prefix search query, a suffix search query, and a wildcard matching; and
      determining a relative location of the element in the DOM tree structure, wherein the determination of the relative location of the element is based on fuzzy matching according to a predetermined percentage of one or more matching attributes and based on respective positions of one or more elements in the DOM tree structure.

2. The method of claim 1, wherein the DOM tree structure includes a plurality of nodes respectively corresponding to a plurality of elements for a specified web page.

3. The method of claim 1, wherein the plurality of attributes include at least one of class, name, and ID attributes.

4. The method of claim 1, wherein determining the location of the element in the DOM tree structure comprises:
   determining if there is an exact match of at least one attribute among the plurality of attributes corresponding to at least one element in the DOM tree structure.

5. The method of claim 4, further comprising:
   if no exact match of at least one attribute to at least one element in the DOM tree structure is determined:
      performing a search of the DOM tree structure according to a prefix search query based on at least one attribute;
      performing a search of the DOM tree structure according to a suffix search query based on at least one attribute; and
      performing a search of the DOM tree structure according to a wildcard matching criteria based on at least one attribute.

6. The method of claim 5, further comprising:
   determining a relative location of an element in the DOM tree structure from at least one of the searches according to the prefix search query, the suffix search query, and the wildcard matching criteria.

7. The method of claim 6, wherein determining the relative location of the element is according to fuzzy matching based on a confidence level of the prefix search query, the suffix search query, and the search according to the wildcard matching criteria.

8. The method of claim 7, wherein the confidence level indicates an amount of matching of a search and a respective attribute of a respective element in the DOM tree structure.

9. The method of claim 1, wherein determining the relative location of the element in the DOM tree structure is based on a previously successful determined location of the element in the DOM tree structure.

10. The method of claim 9, wherein the relative location of the element is determined by searching from neighboring nodes of the DOM tree structure from the previously successful determined location of the element.

11. The method of claim 10, wherein the previously successful determined location of the element is based on a comparison of a prior version of the DOM tree structure with a current version of the DOM tree structure.

12. The method of claim 11, wherein the comparison is performed by utilizing a hash of one or more attributes of the prior version of the DOM tree structure and a hash of the one or more attributes of the current version of the DOM tree structure.

13. The method of claim 12, wherein the one or more attributes include a location attribute.

14. The method of claim 12, wherein the hash of the one or more attributes is based on a hash function.

15. A system for locating an element in a document object model (DOM) tree structure based on fuzzy matching of attributes of the element and relative positioning of other elements in the DOM tree structure, the system comprising:
   one or more processors;
   memory accessible by the one or more processors;
   one or more modules stored in the memory and configured for execution by the one or more processors, the one or more modules comprising:
      a DOM attributes module configured to receive a plurality of attributes for searching an element in a DOM tree structure, wherein the DOM tree structure includes one or more nodes respectively representing different elements in a web page;
      a DOM attributes search module configured to determine a location of an element in a DOM tree structure based on the plurality of attributes, wherein the location of the element corresponds to a respective node in the DOM tree structure; and a relative location module configured to:

if the location of the element is not successfully determined based on the plurality of attributes, search the DOM tree structure based at least in part on one of: a prefix search query, a suffix search query, and a wildcard matching criteria; and determine a relative location of the element in the DOM tree structure, wherein the determination of the relative location of the element is based on fuzzy matching according to a predetermined percentage of one or more matching attributes and based on respective positions of one or more elements in the DOM tree structure.

16. The system of claim 15, wherein the DOM attributes search module is further configured to:

determine if there is an exact match of at least one attribute among the plurality of attributes corresponding to at least one element in the DOM tree structure.

17. The system of claim 16, wherein the relative location module is further configured to:

if no exact match of at least one attribute to at least one element in the DOM tree structure is determined by the DOM attributes search module:

perform a search of the DOM tree structure according to a prefix search query based on at least one attribute;

perform a search of the DOM tree structure according to a suffix search query based on at least one attribute; and perform a search of the DOM tree structure according to a wildcard matching criteria based on at least one attribute.

18. The system of claim 17, wherein the relative location module is further configured to:

determine a relative location of an element in the DOM tree structure from at least one of the searches according to the prefix search query, the suffix search query, and the wildcard matching criteria.

19. The system of claim 15, wherein determining the relative location of the element in the DOM tree structure is based on a previously successful determined location of the element in the DOM tree structure.

20. The system of claim 19, wherein the relative location of the element is determined by searching from neighboring nodes of the DOM tree structure from the previously successful determined location of the element.

21. The system of claim 20, wherein the previously successful determined location of the element is based on a comparison of a prior version of the DOM tree structure with a current version of the DOM tree structure.

22. The system of claim 21, wherein the comparison is performed by utilizing a hash of one or more attributes of the prior version of the DOM tree structure and a hash of the one or more attributes of the current version of the DOM tree structure.

23. A machine-readable, non-transitory, storage medium comprising instructions stored thereon, which when executed by a processor of a machine, cause the machine to perform operations comprising:

receiving a plurality of attributes for searching an element in a document object model (DOM) tree structure;

determining if there is an exact match of at least one attribute among the plurality of attributes corresponding to at least one element in the DOM tree structure; and if there is no exact match of at least one attribyute among the plurality of attributes:

searching the DOM tree structure based at least in part on one of: a prefix search query, a suffix search query, and a wildcard matching criteria; and determining a relative location of the element in the DOM tree structure, wherein the determination of the relative location of the element in the DOM tree structure is based on fuzzy matching according to a confidence level of one or more matching attributes and based on respective positions of one or more elements in the DOM tree structure.

* * * * *